(12) United States Patent
Brash

(10) Patent No.: US 7,958,698 B2
(45) Date of Patent: Jun. 14, 2011

(54) RESIDUAL GAS REMOVAL METHOD

(75) Inventor: Kenneth George Brash, Wollongong (AU)

(73) Assignee: Asiaworld Shipping Services Pty Ltd, Artarmon (AU)

( * ) Notice: Subject to any disclaimer, the term of this patent is extended or adjusted under 35 U.S.C. 154(b) by 59 days.

(21) Appl. No.: 10/582,320

(22) PCT Filed: Dec. 9, 2003

(86) PCT No.: PCT/AU03/01650
§ 371 (c)(1),
(2), (4) Date: Feb. 26, 2007

(87) PCT Pub. No.: WO2005/056425
PCT Pub. Date: Jun. 23, 2005

(65) Prior Publication Data
US 2007/0163435 A1    Jul. 19, 2007

(51) Int. Cl.
*B65B 31/04* (2006.01)
*B65B 29/00* (2006.01)
(52) U.S. Cl. .............................................. 53/432; 53/90
(58) Field of Classification Search .................... 53/400, 53/403, 405, 432, 52, 84, 90, 510, 111 RC
See application file for complete search history.

(56) References Cited

FOREIGN PATENT DOCUMENTS

| | | |
|---|---|---|
| DE | 4306064 A1 | 9/1994 |
| EP | 0 457 431 | 11/1991 |
| EP | 0136042 B1 | 1/1992 |
| EP | 0353021 B2 | 10/1995 |
| JP | 53-106342 | 8/1953 |
| JP | 02-303442 A | 12/1990 |
| JP | 08322449 A * | 12/1996 |
| JP | 11-168135 A | 6/1999 |
| WO | WO 93/17941 | 9/1993 |
| WO | WO 00/23350 | 4/2000 |
| WO | WO 01/83317 A1 | 11/2001 |
| WO | WO 02/03797 | 1/2002 |
| WO | WO 02/03797 A1 | 1/2002 |

* cited by examiner

*Primary Examiner* — Rinaldi I. Rada
*Assistant Examiner* — John Paradiso
(74) *Attorney, Agent, or Firm* — Neifeld IP Law, P.C.

(57) ABSTRACT

A method of removing a residual gas from inside a conventional shipping container is disclosed. The method first involves the step of accessing the container by opening a door of the container and fitting a panel to the open door space. Next the method involves extracting at least some of the residual gas present in the container via an outlet valve located at the panel using an external suction pump. Finally the method involves providing a flow of a flushing gas into the container via an inlet valve located at the panel to flush residual gas from the container. The total pressure of gases in the container can be monitored and controlled by adjusting the flow of gases in the inlet and outlet holes or valves.

36 Claims, 5 Drawing Sheets

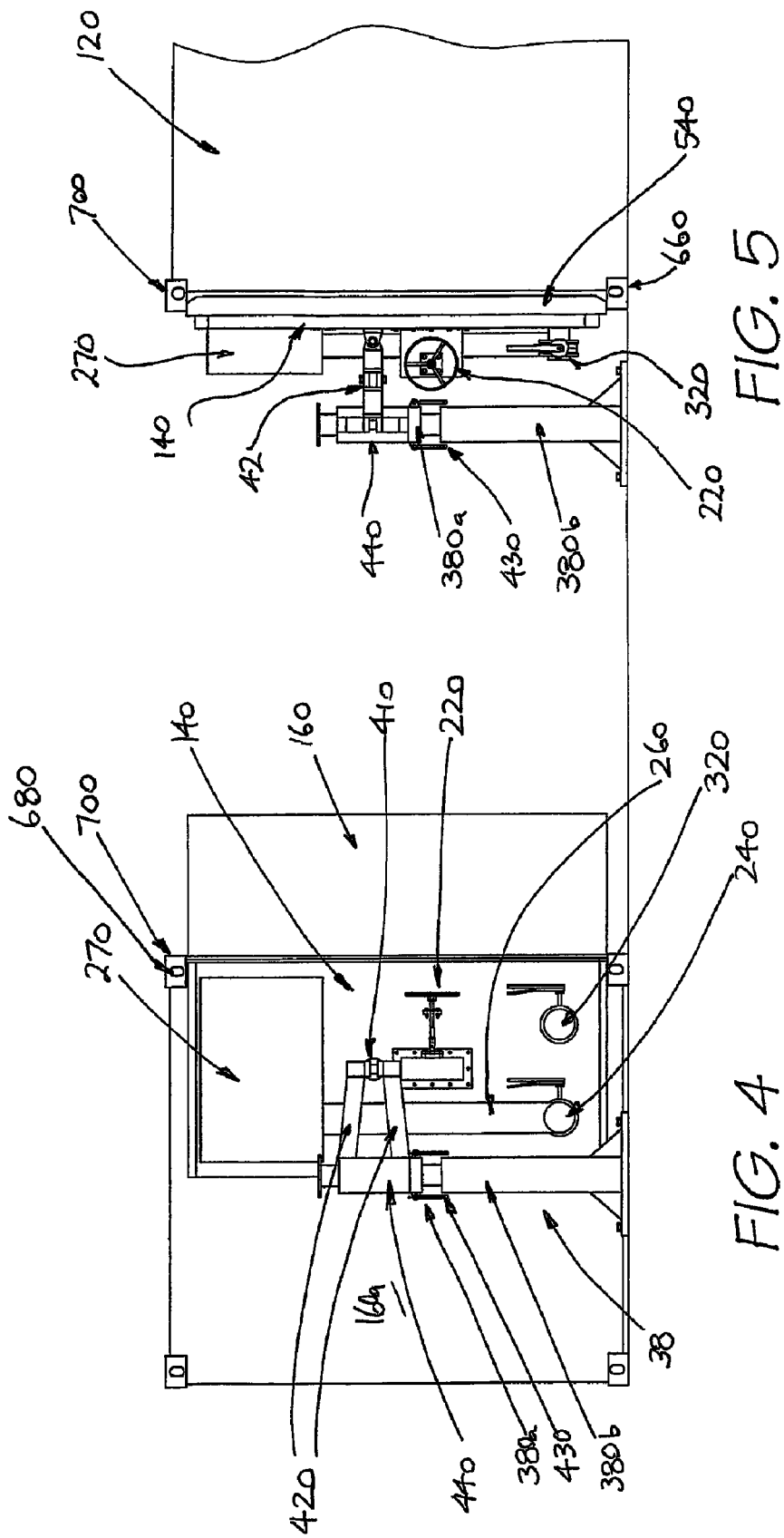

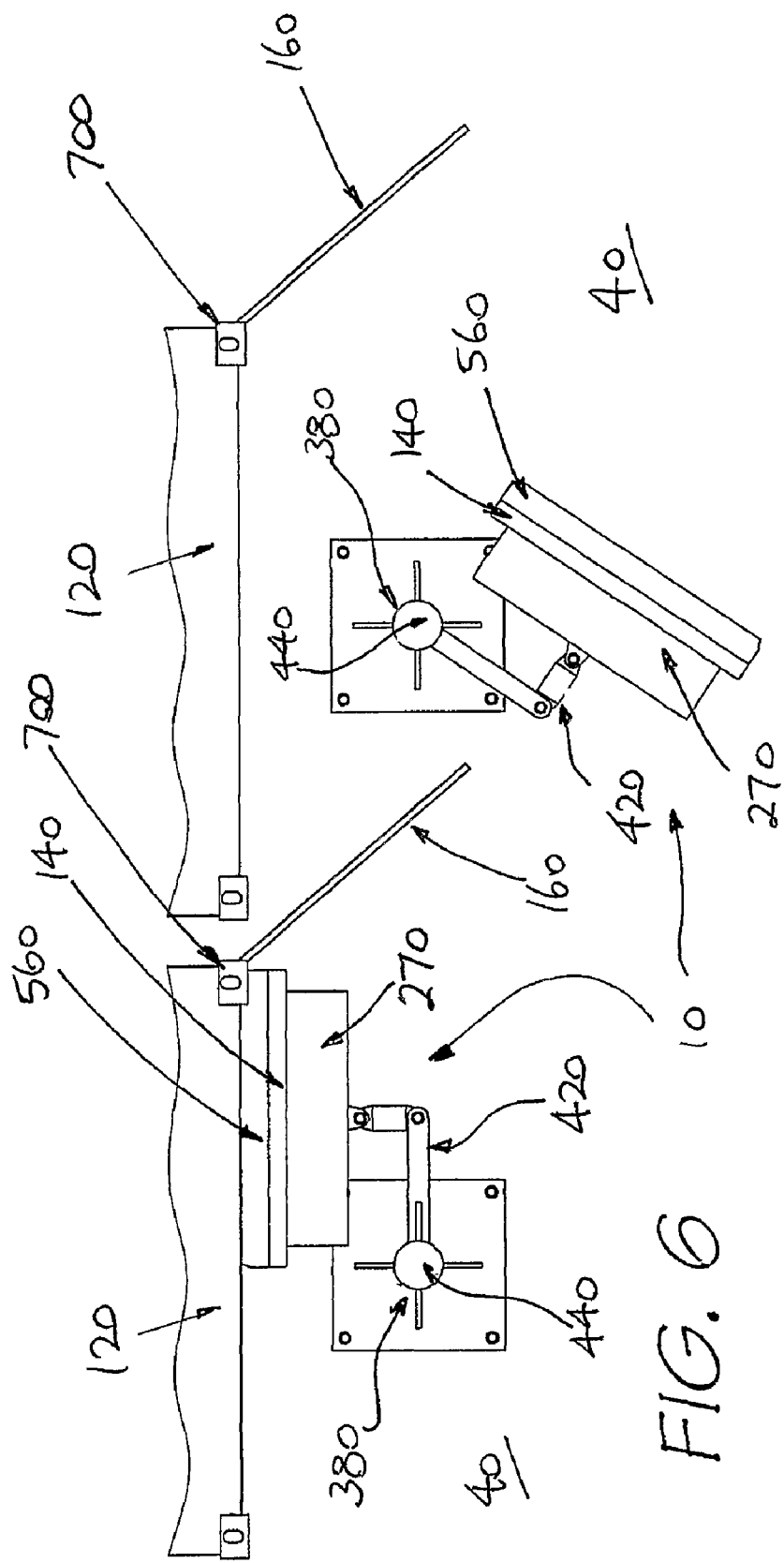

RESIDUAL GAS REMOVAL METHOD

FIELD OF THE INVENTION

The present invention relates generally to a method for removing a residual gas from an enclosure. The invention will primarily be described with reference to its use in removing a residual gas or gases from cargo shipping containers, but the invention can have broader application to other enclosures used for bulk materials storage or for transportation where residual amounts of gas can be present etc.

BACKGROUND TO THE INVENTION

Many types of goods and produce are shipped all over the world in conventional shipping containers. Often the goods being held in the container are fumigated prior to shipment by passing a fumigant gas of some type into the container to exterminate pests, parasites, insects or other vermin from another country, such as for example borers, lice, ticks, fleas or termites. Such containers also often contain timber dunnage and other bulk materials for packing around goods being shipped.

Although the containers can be substantially vented by known methods after fumigation, there are often residual amounts of fumigant which are adsorbed into the goods, produce and packing materials located in the container. These fumigants can slowly desorb over time during shipping of the re-sealed container. Also there can be free fumigant gas which becomes trapped in pockets between articles or packing materials in a container, particular when the container has been packed very full of cargo. Such gases can pose an environmental exposure risk for persons who may access the container upon its arrival and unpacking at its destination. Current methods of ventilation of an opened container, such as opening the container end doors for a period of time, are ineffective at fully eliminating trapped or desorbed gases, and highly dangerous from an occupational health standpoint, since the gases used for effective fumigation are extremely toxic.

In other situations, a container can be used to transport painted, enameled or lacquered items such as furniture or vehicles or other articles which can emit noxious smells or fumes over time which can become concentrated in the confined container space. Also if a chemical or a solvent being transported leaks during movement of the container this can create a residual gas in the container. If perishable goods are being transported and become moldy or rotten, this can also result in the generation of noxious gases. In any of these situations the gases or vapours generated in the container can pose an environmental exposure risk and possibly overpower or poison persons who may access and enter the container upon its arrival and unpacking at its destination.

In the specification which follows, when the term "residual gas" is used it refers to any measurable quantity of gases, fumes or vapours remaining in, or generated in, an enclosed chamber, the chamber having been sealed for a period of time. When the term "conventional shipping container" is used it refers to the commonly used containers of varying lengths and heights (for example 40-foot length or 20-foot length containers), well known in the cargo shipping and rail transportation industries. These containers normally are made of metal with corrugated side walls and an outwardly openable double door located at one end of the container for access thereinto.

SUMMARY OF THE INVENTION

In a first aspect the present invention provides a method of removing a residual gas from inside a conventional shipping container, the method comprising the steps of:
 accessing the container;
 extracting at least some of the residual gas present in the container; and
 providing a flow of a flushing gas into the container to flush residual gas from the container.

Such a method allows trapped residual gases inside the container to be safely extracted with minimal risk to persons who may need to access the container during its later unpacking.

Preferably the step of extracting the residual gas reduces gas pressure in the container below ambient atmospheric pressure outside the container.

Preferably when the pressure of residual gas in the container reaches a pre-determined value, the flow of flushing gas is initiated and the gas pressure in the container increases.

In a second aspect the present invention provides a method of removing a residual gas from inside a conventional shipping container, the method comprising the steps of:
 accessing the container;
 providing a flow of a flushing gas into the container to flush the residual gas from the container; and
 extracting a flow of the flushing gas and the residual gas until at least some of the residual gas present in the container is removed.

Preferably the total pressure of gases within the container is monitored and controlled.

Preferably a majority of the residual gas present in the container is extracted.

Preferably the method further comprises the step of absorbing/adsorbing at least part of the residual gas extracted from the container into/onto an absorption/adsorption means. Most preferably substantially all of the extracted residual gas is absorbed/adsorbed into/onto the absorbing/adsorbing means.

Preferably the method further comprises the step of washing the absorption/adsorption means to remove the absorbed/adsorbed residual gas.

Preferably the step of accessing the container involves:
 opening a door of the container; and
 operatively coupling a gas inlet means and a gas extraction means to the container at the open door so that the container is sealed during the extraction and flushing of gases.

Preferably the flushing gas is introduced via the gas inlet means.

Preferably gas is extracted via the gas extraction means.

Preferably the flushing gas is atmospheric air.

Preferably the container is provided with means for monitoring and controlling the pressure of gas in the container.

In a third aspect the present invention provides a method of removing a residual gas that is present in an enclosure, the method comprising the steps of:
 accessing the enclosure to operatively couple a gas inlet means and a gas extraction means thereto;
 extracting a flow of the residual gas via the gas extraction means until at least some of the residual gas present is removed; and
 providing a flow of a flushing gas into the enclosure via the gas inlet means to flush the residual gas from the enclosure.

Preferably the step of extracting the residual gas reduces gas pressure in the enclosure below ambient atmospheric pressure outside the enclosure.

Preferably when the pressure of residual gas in the enclosure reaches a pre-determined value, the flow of flushing gas is initiated and the gas pressure in the enclosure increases.

In a fourth aspect the present invention provides a method of removing a residual gas that is present in an enclosure, the method comprising the steps of:
- accessing the enclosure to operatively couple a gas inlet means and a gas extraction means thereto;
- providing a flow of a flushing gas into the enclosure via the gas inlet means to flush the residual gas from the enclosure; and
- extracting a flow of the flushing gas and the residual gas via the gas extraction means until at least some of the residual gas present in the enclosure is removed.

Preferably in either the third or fourth aspects the enclosure is defined by a conventional shipping container.

Preferably the method of the third or fourth aspects is otherwise as defined in the first or second aspects.

In a fifth aspect the present invention provides residual gas removal apparatus arranged to be operatively coupled to an enclosure for removing residual gas from inside the enclosure, the apparatus comprising:
- gas inlet means for introducing a flushing gas into the enclosure;
- gas extraction means for extracting gas from the enclosure;
- pressure monitoring means for monitoring the total pressure of gases within the enclosure; and
- controlling means for controlling the flow of gases through at least one of the gas inlet and gas extraction means in response to the monitored pressure within the enclosure.

Such pressure controlling means can permit the pressure in the enclosure to be elevated or reduced below ambient atmospheric pressure levels. In either condition, trapped gas located between goods or packing in the enclosure can be forced out of small pockets and more easily and efficiently extracted from the enclosure with minimal risk to persons who may need to access the container during its later unpacking.

Preferably the apparatus further comprises absorption/adsorption means for absorbing/adsorbing residual gas extracted from the container.

Preferably the absorption/adsorption means comprises an absorption/adsorption bed including activated carbon to which at least part of the extracted residual gas attaches at its surface and in its pores.

Preferably the residual gas removal apparatus also comprises a panel arranged in use to be coupled to the enclosure in a sealing manner, the gas inlet means and the gas extraction means operatively coupled or mounted to the panel.

In a sixth aspect the present invention provides apparatus arranged to be operatively coupled to an enclosure for removing residual gas from inside the enclosure, the apparatus comprising:
- a framework mountable onto a surface and locatable adjacent to the enclosure in use; and
- a member mounted to the framework and comprising gas inlet means for introducing a flushing gas into the enclosure, gas extraction means for extracting gas from the enclosure and coupling means for coupling the member to the enclosure;
wherein the member is moveable between an in use coupled position in which the coupling means couples the member to the enclosure and a de-coupled position in which the member is spaced from the enclosure.

The ready coupling and decoupling of the residual gas removal apparatus achieved by moving the member in relation to the enclosure can facilitate its operation in a rapid manner, consequently minimising the risk of exposure to persons who operate the apparatus as well as those persons who need to access the enclosure during its later unpacking.

Preferably the member is pivotally mounted to the framework.

Preferably the member further comprises a panel for coupling to an opening in the enclosure.

Preferably the apparatus of the sixth aspect is otherwise as defined in the fifth aspect.

BRIEF DESCRIPTION OF THE DRAWINGS

Notwithstanding any other forms which may fall within its scope, preferred forms of the invention will now be described, by way of example only, with reference to the accompanying drawings in which:

FIG. 4 shows an end view of a shipping container fitted externally with a residual gas removal apparatus in accordance with another embodiment of the invention;

FIG. 5 is a side view of the residual gas removal apparatus of FIG. 4;

FIG. 6 is a plan view of the residual gas removal apparatus of FIG. 4; and

FIG. 7 is a plan view of the residual gas removal apparatus of FIG. 4 when the apparatus is decoupled from the shipping container.

DETAILED DESCRIPTION OF THE PREFERRED EMBODIMENTS

As shown in the Figures, various embodiments of a residual gas removal apparatus 10 are shown that are arranged to be operatively coupled to an enclosure in the form of a conventional shipping container 12, although in other embodiments the apparatus can be coupled in use to an opening in any type of enclosure, for example a silo, a shed, warehouse and rooms of any dimension. A typical opening into the enclosure can include a doorway, a window, an inspection port or a customised portal to accommodate the apparatus 10.

Figure 1:
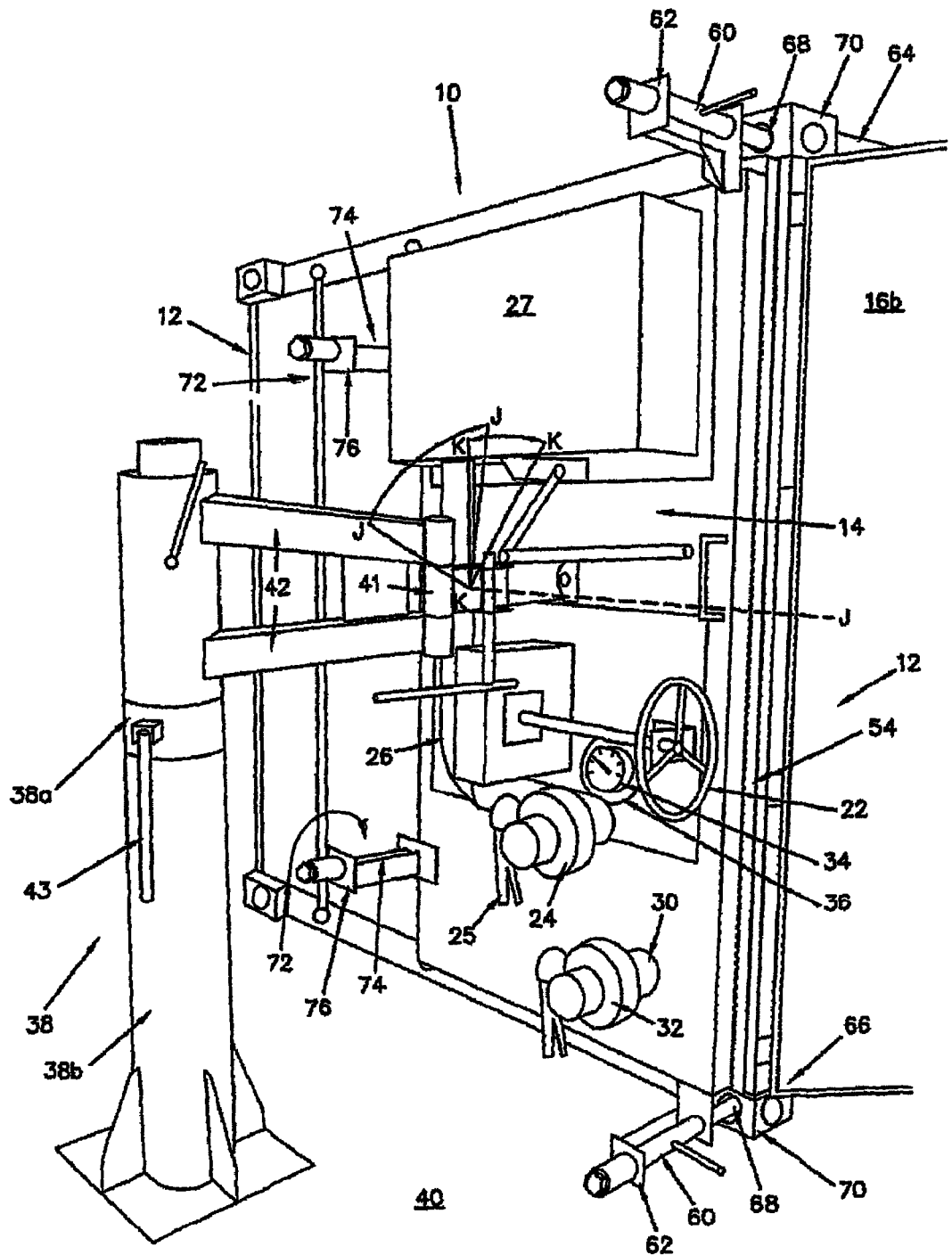
FIG. 1 shows a right side perspective view of a shipping container fitted externally with a residual gas removal apparatus in accordance with one embodiment of the invention.
Figure 2:
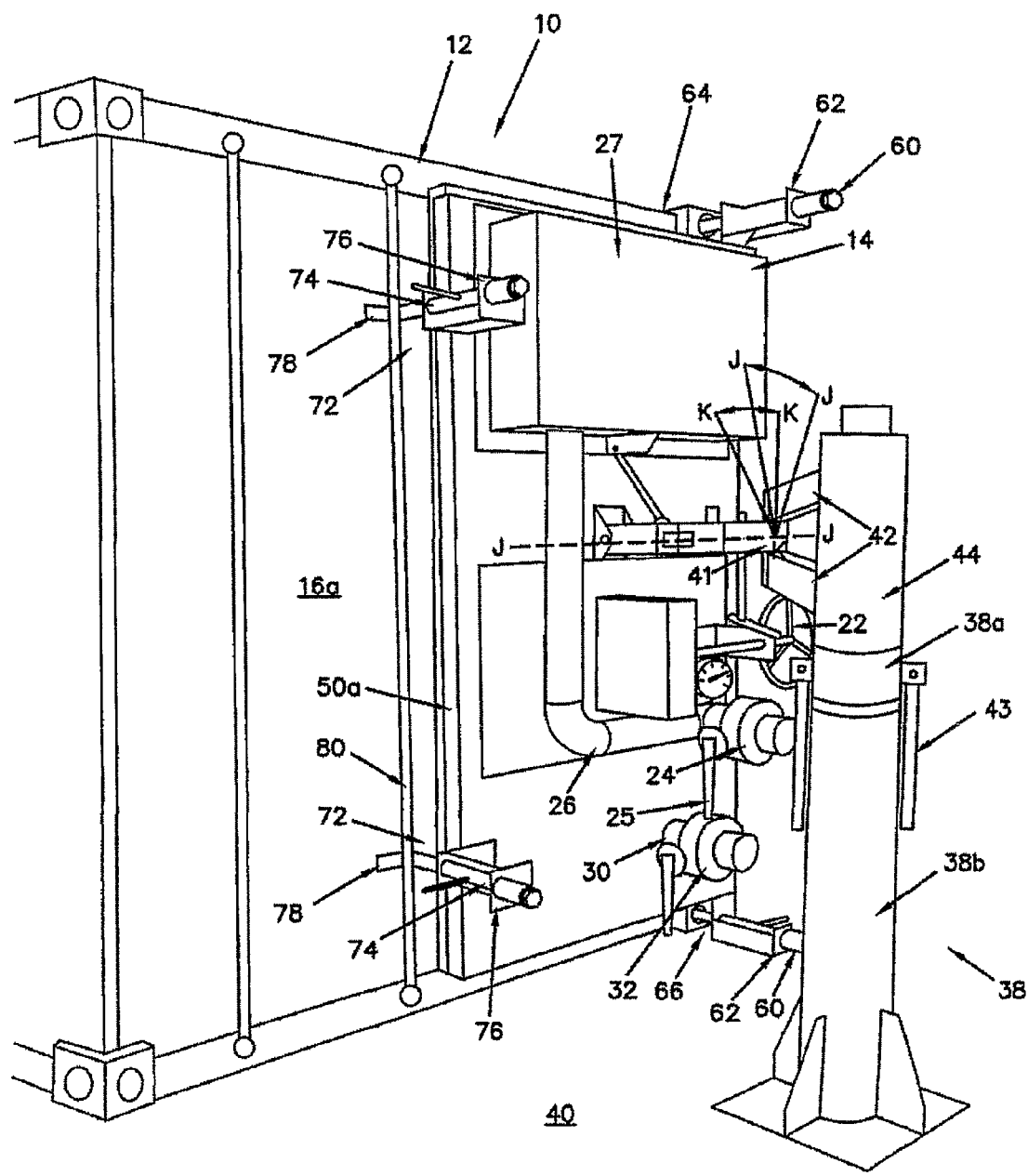
FIG. 2 shows a left side perspective view of the embodiment of FIG. 1.
Figure 3:
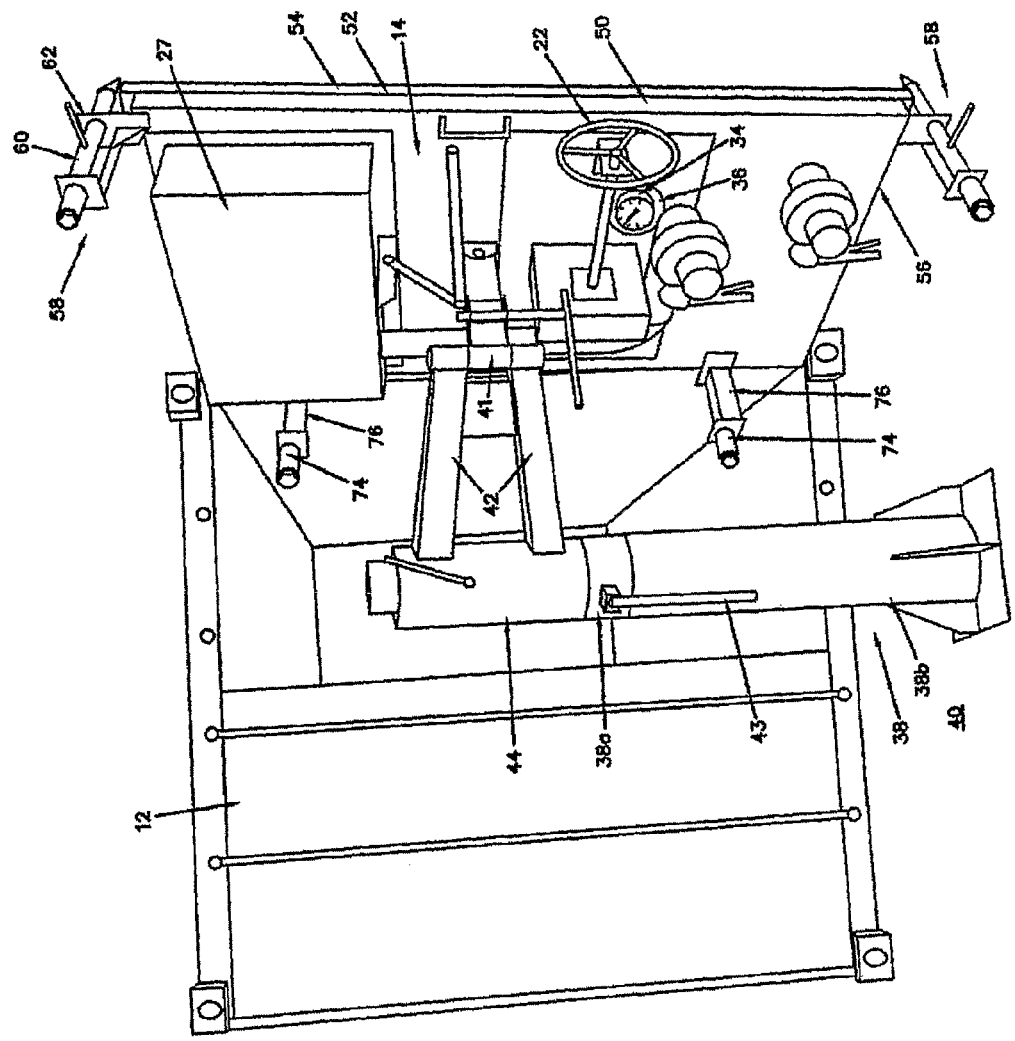
FIG. 3 shows an end perspective view of the embodiment of FIG. 1 in which the residual gas removal apparatus is de-coupled from the shipping container.

Referring to FIGS. 1 to 3, the apparatus 10 comprises a rectangular-shaped panel 14 which is of a size that can be coupled in use to the container 12 once an end door 16 of the container 12 has been opened. Embodiments of the panel 14 have two standard height sizes (8 foot, 6 inches, and 9 foot, six inches) which correspond closely to the standard door height of conventional shipping containers available in the world today. In use the panel 14 is moved into the door opening of the container and attached at the perimeter 18 of the door opening using a gas-tight seal. The gas-tight seal is achieved by actuation of an expandable seal which in one form comprises a laterally moveable frame 52 located on each of the opposing elongate sides 50 of the panel 14, the outermost edge of each frame 52 being fitted with a 100 mm width by 100 mm length compressible rubber gasket 54. In use the frames 52 are laterally moveable so as to project outwardly of the sides 50 of the panel 14 in response to rotation of a wheel 22 located on the front of the panel 14. Rotation of the wheel 22 actuates a cam mechanism located on the rear face of the panel 14 (visible from the interior of the container 12 only) which moves the frames 52 and their rubber gaskets 54 laterally outwardly from the sides 50 of the panel so that the gaskets 54 press firmly against opposing side edges of the door opening.

To complete the gas tight seal around the panel 14 there is also a 100 mm width by 100 mm length compressible rubber gasket 56 positioned on the uppermost and lowermost edge of the panel 14 which are sized to abut and be in a friction fit with the respective upper and lower side edges at the perimeter 18 of the container door opening.

In a further embodiment the panel can be secured against the passage of gases from the interior of the container by means of an inflatable rubber gasket seal, which can be inflated by means of an external air compressor.

The panel 14 is also attached to the container 12 by two corner locking assemblies 58 located on one elongate side 50 of the panel 14. Each of these locking assemblies comprise a spear-headed shaped bolt 60 mounted on a bracket 62 that is attached externally to the panel 14 at positions which, when the panel 14 is coupled to the container 12, correspond to the outermost upper 64 and lower 66 corners of the container 12. The bolts 60 are slidable in relation to their respective bracket 62 and, when the panel 14 is coupled to the container 12, are receivable into the oval-shaped holes 68 in the corner casings 70 located on the outermost upper 64 and lower 66 corners of the container 12. When the bolts 60 are moved into receipt into the oval-shaped holes 68, these bolts 60 can then be partially rotated about their elongate axis whereupon at least some of the outer surface of the bolt 60 comes into frictional engagement with an interior edge of the oval-shaped holes 68 and the panel 14 is further secured to the container 12 to hold the panel 14 thereat.

Furthermore the panel 14 is also attached to the container 12 by two side locking assemblies 72 arranged on the opposing elongate side 50a of the panel 14 to the one side 50. Each of these locking assembles 58 comprise a bolt 74 that is slidably mounted on a bracket 76 that is attached externally to the panel 14 at spaced apart positions, one bracket and bolt combination nearer the top of the panel 14 and the other bracket and bolt combination nearer the base of the panel 14. The ends of each of these bolts that are closest to the container door 16a have a hook 78 that is frictionally engagable with a vertical locking bar 80 located on the exterior of the container end door 16a, and the panel 14 is thus further secured to the container 12 to hold the panel 14 thereat.

Any number of other types of fastening pins, cams, clips or locking devices which can secure the corners or sides of the panel 14 to the perimeter 18 of the container door opening are also within the scope of the present invention.

The residual gas removal apparatus 10 also includes a framework in the form of a post 38 which is screw mounted onto the surrounding ground surface 40 and located adjacent to the container 12 in use. The panel 14 is mounted via a joint 41 which is itself positioned between two linkage arms 42 that are joined to a sleeve 44 which is mounted to the post 38 and arranged to journal thereabout in order to swing or pivot the panel 14 into position into the open doorway of the container 12. An upper portion 38a of the post 38, about which the sleeve is positioned, is arranged to be vertically displaced in relation to a lower portion 38b of the post 38 by means of hydraulic pistons 43 in order that the overall height of the post 38 and thus the panel 14 can be adjusted. It is also possible to twist the joint 41 in any number of directions so that the panel 14 can be tilted to a pre-determined angle from a vertical orientation (pivoted about a horizontal axis J in a direction of movement as indicated in the drawings by arrow J-J), and also to tilt the panel 14 to a pre-determined angle from a vertical axis (e.g. in a clockwise or anticlockwise direction in the plane of the panel about rotation point K, as indicated by arrow K-K). Thus, regardless of whether or not the container is on a perfectly square footing on surrounding ground, the panel 14 can be oriented through a number of degrees of freedom so that it fits squarely into the container door opening without compromising the fit of the gas-tight seal.

Using this pivotal movement mechanism, the panel 14 is able to be easily and flexibly rotated and pulled into a position where it can be coupled in use to the container 12 upon the opening of one of the container end doors 16, and subsequently de-coupled from the container 12 and moved sufficiently away from the container 12 to allow access and unloading of the container contents to take place. Such ready coupling and decoupling of the residual gas removal apparatus 10 may be facilitated by just one person, and the movement of the panel 14 is able to be made in a rapid manner, consequently minimising the risk of gas exposure to persons who operate the apparatus, as well as to those persons who need to access the container itself during its later unpacking. The coupling and de-coupling procedure can be accomplished without the need for heavy lifting or exertion by an operator, thus minimising any likelihood of back strain or fatigue.

As shown in the drawings, the panel 14 also includes a gas inlet means in the form of a valve 24 coupled to a pipe 26 that is located on the exterior face of the panel 14, the pipe 26 leading to a circulation fan housing 27 in which is mounted a circulation fan 29. The housing 27 protrudes from the panel 14, and the circulation fan 29 is arranged to face inwardly toward the interior of the container 12 when the panel 14 is coupled in the door opening of the container 12. Typically the valve 24 has a tap handle 25 or other opening mechanism to permit actuation of the valve 24 mechanism and to permit gas to flow therethrough.

A flushing gas such as atmospheric air is introduced into the interior of the container 12 via the valve 24 and the pipe 26, and is then more evenly dispersed throughout the interior of the container 12 by the action of the fan 29. In other embodiments of the panel, no fan 29 or pipe 26 is required, and the flushing gas can merely be pumped directly into the interior of the container via a hole in the panel 14.

The panel 14 is also fittable with a gas extraction means in the form of a flexible hose pipe 28 which can be directly operatively coupled to a further hole 30 in the panel 14 and connected to a suction pump 31 which can be mounted onto the panel 14 itself, or located on surrounding ground, or located on an adjacent service vehicle, for example. In the embodiment shown in the drawings, the hole 30 via which gases are extracted from the container in use is located in the lower region of the panel 14, which is typically where the heavier than air toxic gas molecules used in fumigation (for example methyl bromide) will naturally concentrate without recirculation.

In further embodiments the gas inlet means can be fitted with a gas pump 33 which can be mounted onto the panel 14 itself, or located on surrounding ground, or located on an adjacent service vehicle and connected to the valve 24 on the panel 14 via a flexible hose pipe 28a to deliver a flow of a flushing gas, for example, atmospheric air, into the container 12. In such situations the circulation fan may not be required as the positive flow of air through the valve 24 and pipe 26 may be propelled sufficiently deeply into the interior of the container 12 for good flushing of residual gas to occur.

Similarly the gas extraction means can also include a valve 32 fitted to the hole 30 in the panel 14 and the valve 32 connected to the flexible hose pipe 28 and suction pump 31. Having two valves 24, 32 fitted to the panel permits regulation of the pressure in the interior of the container 12, as will shortly be described.

The apparatus 10 also includes pressure monitoring means in the form of a pressure gauge 34 for monitoring the total pressure of gases within the container 12. Typically the gauge 34 is mounted to a further hole 36 in the panel 14, with a pressure sensor device connected thereto and located within the container 12. The apparatus can also include a controlling means such as an electronic controlling system, for controlling the flow of gases through at least one of the gas inlet valve 24 and gas extraction valve 32 in response to the monitored pressure within the container 12. For example, the valves 24, 32 can be independently operated so that the monitored pressure in the container 12 can be allowed to fall below atmospheric pressure (such as by actuating the suction pump 31, whilst the gas inlet valve 24 remains closed) or rise above atmospheric pressure (such as by closing the gas extraction valve 32 and actuating flow of a flushing gas from gas pump 33 via the gas inlet valve 24), or maintained at a pre-determined value, for example at atmospheric pressure.

Such pressure control can permit the pressure in the container to be elevated above or reduced below ambient atmospheric pressure levels so that trapped gas located between goods or packing in the enclosure can be forced out of small pockets or gaps, and more easily and efficiently extracted from the enclosure with minimal risk to persons who may need to access the container during later unpacking of its contents.

When residual gases are extracted from the container, rather than being vented to air (which may still be very hazardous to nearby workers, or even illegal, depending on the gas), these gases can be passed over an absorption/adsorption means to physically collect them. In one embodiment this absorption/adsorption means can be in the form of an absorption/adsorption bed including a cartridge packed with activated carbon particles to which at least part of the extracted residual gas attaches, at the surfaces of the particles and in the pores of the carbon. Depending on the quantity of carbon and the rate of absorption/adsorption uptake, the residual gases can be entirely stripped from the flow of gases. Depending on the nature of the residual gases, other absorbing or adsorbing materials may be equally suitable for this purpose (e.g. zeolites, activated earth materials etc). In some embodiments the absorption/adsorption bed can be periodically washed to remove the absorbed/adsorbed gases and regenerated for reuse. In one form an activated carbon bed with absorbed/adsorbed methyl bromide fumigant can be washed with a solution of sodium thiosulphate, to chemically decompose the methyl bromide and to yield one or more benign salts, such as sodium bromide and sodium methylthiosulphate.

In further embodiments of the invention, the residual gas extracted and absorbed/adsorbed can be of different types, depending on the situation. For example, it is within the scope of the invention for fumigant gases such as phosphine, sulfural fluoride or carbon dioxide to be extracted and decomposed. In the case of phosphine, passing the gas through an absorption cartridge of wet carbon causes the gas to be converted to form phosphoric salts on the outside surface of the carbon; these salts can be subsequently washed away from the carbon. In the case of sulfural fluoride, passing the gas through an absorption cartridge containing calcium carbonate causes the gas to be converted to form various sulfur salts which again can be safely disposed of. If carbon dioxide is used as a fumigant to suffocate pests etc, it may simply be removed from the container by bubbling into a vessel or cartridge containing water to form carbonic acid, and subsequently discarded.

Any of the absorption/adsorption means described can be located on a service vehicle which in use is located adjacent to the container 12 and which receives the flow of gas from the suction pump 31. Such an arrangement ensures that at all times the extracted residual gases are quickly removed from the gas stream, which in turn ensures that a highly safe operating environment can be maintained with a low incidence of occupational health risk to operators.

The operation of the residual gas extraction apparatus will now be described in detail. When a shipping container is received from another location, where the container has previously been subjected to fumigation, it is often unclear whether the container has been substantially cleared of fumigant prior to being shipped, and thus whether there are any residual gases present. Gases may also have desorbed from the goods in the container during transportation. Rather than immediately open the container doors with consequent safety risks, a probe can be inserted into a small portal or hole in the container wall and the quantity of residual gases of certain types monitored. For example, during methyl bromide fumigation in a container, a typical concentration of gas is around 48 grams per cubic metre, which, after fumigation has ceased, may have fallen to around 20-30 grams per cubic metre due to some losses, decomposition, adsorption and the like. After the container has been evacuated, resealed and shipped, it is not unusual to have a residual gas concentration of 20-30 parts per million of methyl bromide, although levels of 1000 parts per million are not unknown. A residual gas removal method aims to reduce the concentration of such gases to below 5 parts per million and as close to zero as possible.

If residual gases are detected, residual gas removal is required. The operator (dressed in safety ventilation equipment) opens one of the container doors and very quickly couples a panel 14 as well as a selection of gas inlet means and gas extraction means to the container at the open door so that the container is sealed from atmospheric leakage during the subsequent extraction and flushing of residual gases. In one operational condition, if it is desired to flush the container at a higher internal pressure than ambient atmospheric pressure in order to drive out the residual gases, the operator may decide to open the valve 24 and actuate air inlet pump 33 to deliver atmospheric air into the container 12 via the flexible hose pipe 28a and pipe 26, whilst at the same time restricting the flow of flushing gas and residual gas out of the container via hole 30 by partially closing valve 32 as well as actuating suction pump 31, which is joined to hole 30 and valve 32 via the flexible hose pipe 28.

In a further operational condition, however, if it is desired to extract residual gases at a container internal pressure which is less than the ambient atmospheric pressure in order to draw out the residual gases, the operator may decide to keep the inlet valve 24 closed initially whilst initiating a flow of residual gas out of the container via hole 30 by fully opening valve 32 as well as actuating suction pump 31, which is joined to hole 30 via flexible hose pipe 28. The pressure in the container can be allowed to fall by any fraction of atmospheric pressure until a pre-determined value is reached (as measured by the pressure gauge 34 and sensor) or until the container side walls start to internally buckle and implode. At this point the valve 24 can be opened and the pressure inside the container can be quickly returned to ambient atmospheric pressure. A flow of flushing gas which enters the container 12 via the valve 24 can then flush the freed residual gases (which are now drawn out of hidden pockets and dead zones of gas inside the container cargo contents) via hole 30, valve 32, flexible hose pipe 28 and suction pump 31.

In a further operational condition, it may be desirable to extract residual gases at a container internal pressure which is equivalent to the ambient atmospheric pressure. In such an instance the operator may decide to keep the inlet valve 24 open at the same time as initiating a flow of residual gas out of the container via hole 30 by fully opening valve 32 as well as actuating suction pump 31, which is joined to hole 30 via flexible hose pipe 28. The packing arrangement or the nature of the contents of the container may not warrant the more complicated pressure control methods of the previous two examples and an ambient container internal pressure may be satisfactory.

In further embodiments it may be useful to repeat any one of these example operational conditions for maximum freeing and extraction of the majority of residual gases from the confines of the container. In still further embodiments, a sequential combination of any of these example operating conditions may be used, depending upon the particular circumstances and the complexity of the entrapment of residual gases. Any of these methods allows trapped residual gases inside the container to be safely extracted with minimal risk to persons who may need to access the container during its later unpacking.

One of the other advantages of the readily movable framework for supporting the panel is that the same pivotable panel can reach a number of adjacently placed shipping containers. In one example, whilst gases are being removed from one container, another container can be placed nearby and be tested and readied for accessing, extracting and flushing of residual gas. As gas removal finishes in the first container, the panel can be de-coupled and moved immediately for coupling with the adjacent second container so that gas removal can commence. While this is happening, the degassed container can be removed and another placed in its position and tested and readied for treatment. Such an operation can provide a more efficient 'continuous' gas removal operation while minimising the capital cost of the equipment used.

Referring now to FIGS. 4 to 7, these Figures depict another embodiment of the residual gas removal apparatus which is mostly very similar to the embodiment shown in FIGS. 1-3. In order to avoid repetition and for ease of reference similar components and features of this alternative embodiment of the invention has been designated with an additional "0", such as the panel 140.

Now that preferred embodiments of the present invention have been described in some detail it would be apparent to those skilled in the art that the residual gas extraction apparatus has at least the following advantages over the admitted prior art:

1. The apparatus is adapted for use with a conventional shipping container or at a wall of any enclosed space and is relatively convenient and uncomplicated to operate;

2. The apparatus is relatively effective in removing residual gases from an enclosed space, and can be configured to operate in a number of different ways to maximise gas extraction; and 3. The apparatus is "environmentally friendly" in that any collected residual gases can be safely expelled or captured rather than be discharged into a workplace or populated environment.

Those skilled in the art will appreciate that the invention described herein is susceptible to variations and modifications other than those specifically described. For example, the gas inlet and gas extraction means need not be located on a single panel but rather may be mounted on a number of panels or directly mounted onto separate holes made into the same wall or different walls of a container or any other enclosure. In relation to shipping containers, the gas inlet and gas extraction means do not need to be fitted to the open door space at the end of the container. The invention need not be restricted to removal of residual fumigants such as methyl bromide and the like, but rather extends to any gaseous substance which is undesirable or hazardous to human or animal health. The flushing gas used need not be air, and could be an inert gas or any gas combination. The invention need not be restricted to the specific constructional features described, and may for example use a different support framework or another type of expandable seal to those described.

All such variations and modifications are to be considered within the scope of the present invention the nature of which is to be determined from the foregoing description.

The claims defining the invention are as follows:

1. A method of removing a residual gas from inside a conventional shipping container after a period of time in which goods were located in the container, comprising:
   opening an end door of the container;
   removably coupling a panel to the door opening of the container, the panel having a gas inlet and a gas outlet;
   whereby said panel is attached around the perimeter of the door opening with a gas-tight seal;
   extracting at least some of the residual gas present in the container via the gas outlet; and
   providing a flow of a flushing gas into the container via the gas inlet to flush residual gas from the container.

2. The method of claim 1, wherein extracting the residual gas reduces pressure in the container below ambient atmospheric pressure.

3. The method of claim 2, wherein once the gas pressure inside the container reaches a predetermined value, the flow of flushing gas is initiated, and pressure inside the container increases.

4. The method of claim 1, wherein a flow rate or gas pressure within the container is monitored and controlled.

5. The method of claim 1, wherein a majority of the residual gas present in the container is extracted.

6. The method of claim 1, further comprising absorbing/adsorbing at least part of the residual gas extracted from the container into/onto an absorbent/adsorbent.

7. The method of claim 6, wherein substantially all of the extracted residual gas is absorbed/adsorbed into/onto the absorbent/adsorbent.

8. The method of claim 6, further comprising washing the absorbent/adsorbent, decomposing the absorbed/adsorbed residual gas and discarding the absorbent/adsorbent.

9. The method of claim 1, wherein the gas outlet is located lower on the panel relative to the gas inlet.

10. The method of claim 1, wherein said panel contains a plurality of subpanels.

11. The method of claim 1, wherein the flushing gas is atmospheric air.

12. The method of claim 1, wherein the concentration of residual gas in the container is monitored.

13. The method of claim 1, further comprising pumping the flushing gas into the container though the gas inlet.

14. The method of claim 1, further comprising pumping residual gas out of the container through the gas outlet.

15. The method of claim 1, further comprising pumping the flushing gas into the container though the gas inlet and pumping residual gas out of the container through the gas outlet.

16. The method of claim 1, wherein the concentration of residual gas in the container is monitored.

17. A method of removing a residual gas from inside a conventional shipping container after a period of time in which goods were located in the container, comprising:
opening an end door of the container;
removably coupling a panel to the door opening of the container, the panel having a gas inlet and a gas outlet;
whereby said panel is attached around the perimeter of the door opening with a gas-tight seal;
introducing a flow of flushing gas into the container via the gas inlet, then
removing residual gas and flushing gas from the container via the gas outlet.

18. The method of claim 17, wherein a flow rate or gas pressure within the container is monitored and controlled.

19. The method of claim 17, wherein a majority of the residual gas present in the container is extracted.

20. The method of claim 17, further comprising absorbing/adsorbing at least part of the residual gas extracted from the container into/onto an absorbent/adsorbent.

21. The method of claim 20, wherein substantially all of the extracted residual gas is absorbed/adsorbed into/onto the absorbent/adsorbent.

22. The method of claim 20, further comprising washing the absorbent/adsorbent, decomposing the absorbed/adsorbed residual gas and discarding the absorbent/adsorbent.

23. The method of claim 17, wherein the gas outlet is located lower on the panel relative to the gas inlet.

24. The method of claim 17, wherein said panel contains a plurality of subpanels.

25. The method of claim 17, wherein the flushing gas is atmospheric air.

26. The method of claim 17, wherein the concentration of residual gas in the container is monitored.

27. The method of claim 17, further comprising pumping flushing gas into the container though the gas inlet.

28. The method of claim 17, further comprising pumping residual gas out of the container through the gas outlet.

29. The method of claim 17, further comprising pumping flushing gas into the container though the gas inlet and pumping residual gas out of the container through the gas outlet.

30. An apparatus for removing residual gas from a conventional shipping container, comprising:
a panel that can be removably coupled to an end door opening of a conventional shipping container, which is attached around the perimeter of said door opening with a gas-tight seal;
said panel having a gas inlet for introducing a flow of flushing gas into the container, and a gas outlet for removing residual gas from the container;
a device for monitoring gas pressure inside the container;
a controller for controlling the flow of gasses in or out of the container, in response to monitored pressure inside the container.

31. The apparatus of claim 30, further comprising and absorption/adsorption apparatus for absorbing/adsorbing residual gas extracted from the container.

32. The apparatus of claim 31, wherein the absorption/adsorption apparatus comprises a bed of activated carbon.

33. The method of claim 30, wherein the gas outlet is located lower on the panel relative to the gas inlet.

34. The method of claim 30, wherein said panel contains a plurality of subpanels.

35. The apparatus of claim 30, further comprising a framework that is mountable onto a surface and sequentially located adjacent to different shipping containers, wherein the panel is movably mounted on the framework.

36. The apparatus of claim 35, wherein said movable mounting pivots the panel for coupling it to the end door opening of the container.

* * * * *